US008817941B2

(12) United States Patent
Sato et al.

(10) Patent No.: US 8,817,941 B2
(45) Date of Patent: Aug. 26, 2014

(54) PRESSURIZED WATER REACTOR PLANT

(75) Inventors: Takashi Sato, Kanagawa (JP); Kazunori Hashimoto, Kanagawa (JP); Hirohide Oikawa, Kanagawa (JP); Yasunobu Fujiki, Kanagawa (JP); Makoto Akinaga, Kanagawa (JP); Hisaki Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 585 days.

(21) Appl. No.: 13/044,909

(22) Filed: Mar. 10, 2011

(65) Prior Publication Data

US 2011/0158371 A1 Jun. 30, 2011

Related U.S. Application Data

(63) Continuation-in-part of application No. PCT/JP2009/004384, filed on Sep. 4, 2009.

(30) Foreign Application Priority Data

Sep. 30, 2008 (JP) ................................. 2008-255573

(51) Int. Cl.
| | | |
|---|---|---|
| *G21C 9/004* | (2006.01) | |
| *G21C 15/18* | (2006.01) | |
| *G21C 9/00* | (2006.01) | |
| *G21C 15/00* | (2006.01) | |

(52) U.S. Cl.
USPC ........... 376/382; 376/207; 376/210; 376/211; 376/245; 376/249; 376/277; 376/298; 376/299; 376/347; 376/361

(58) Field of Classification Search
USPC ......... 376/245, 249, 207, 210, 211, 219, 250, 376/277, 281–284, 298, 299, 307, 347, 361, 376/366
See application file for complete search history.

(56) References Cited

U.S. PATENT DOCUMENTS

| | | | | | |
|---|---|---|---|---|---|
| 3,722,578 | A | * | 3/1973 | Frei et al. ....................... | 376/307 |
| 3,920,513 | A | * | 11/1975 | Loose et al. ................... | 376/219 |

(Continued)

FOREIGN PATENT DOCUMENTS

| | | |
|---|---|---|
| JP | 62-187291 A | 8/1987 |
| JP | 63-115095 A | 5/1988 |

(Continued)

OTHER PUBLICATIONS

IAEA-TecDoc-1391, "Status of advanced light water reactor designs 2004", IAEA, May 2004, p. 207-p. 231, p. 279-p. 306.
Translation of International Preliminary Report on Patentability of PCT/JP2009/004384, dated May 19, 2011, 8 pages.

*Primary Examiner* — Bernarr Gregory
(74) *Attorney, Agent, or Firm* — Foley & Lardner LLP

(57) ABSTRACT

According to an embodiment, a pressurized water reactor plant has a primary system which includes: a reactor vessel for housing a reactor core which is cooled by a primary coolant, a single steam generator, a hot leg pipe for connecting the reactor vessel and the steam generator, cold leg pipes, at least two primary coolant pumps, and a pressurizer for pressurizing the primary coolant pressure boundary in which the primary coolant flows. The plant also has: a passive cooling and depressurization system which is a primary depressurization means for equalizing the primary system pressure to the secondary system pressure at the time of a tube rupture accident of the steam generator, and a reactor containment vessel containing the primary system and cooling the primary system by air cooling. Thus, a compact pressurized water rector with high economic efficiency, safety, and reliability can be provided.

7 Claims, 7 Drawing Sheets

(56) References Cited

U.S. PATENT DOCUMENTS

| | | | | |
|---|---|---|---|---|
| 3,933,580 | A | * | 1/1976 | Aleite et al. ............... 376/211 |
| 4,278,500 | A | * | 7/1981 | Ailloud et al. ............. 376/282 |
| 4,612,158 | A | * | 9/1986 | Day ........................... 376/250 |
| 4,753,771 | A | * | 6/1988 | Conway et al. ............ 376/282 |
| 5,049,353 | A | | 9/1991 | Conway et al. |
| 5,291,533 | A | | 3/1994 | Orr |
| 5,428,652 | A | * | 6/1995 | Conrads et al. ............ 376/299 |

FOREIGN PATENT DOCUMENTS

| | | |
|---|---|---|
| JP | 02-010196 A | 1/1990 |
| JP | 02-296196 A | 12/1990 |
| JP | 05-172979 A | 7/1993 |
| JP | 06-300879 A | 10/1994 |
| JP | 2000-121788 A | 4/2000 |
| JP | 2009-210283 A | 9/2009 |

* cited by examiner

PRESSURIZED WATER REACTOR PLANT

CROSS REFERENCES TO RELATED APPLICATIONS

This application is a continuation-in-part (CIP) application based upon the International Application PCT/JP2009/004384, the International Filing Date of which is Sep. 4, 2009, the entire content of which is incorporated herein by reference, and claims the benefit of priority from the prior Japanese Patent Application No. 2008-255573, filed in the Japanese Patent Office on Sep. 30, 2008, the entire content of which is incorporated herein by reference.

FIELD

Embodiment described herein relate generally to a pressurized water reactor plant.

BACKGROUND

In general, a pressurized water reactor (PWR) in a commercial nuclear plant for use in power generation or hydrogen production needs to satisfy national safety standards, and the minimum number of loops between steam generators and reactor coolant system loops is set to two.

In a typical conventional two-loop PWR, two reactor coolant system loops are disposed symmetrically with respect to a reactor vessel. A reactor coolant pump and a steam generator are disposed in each of the reactor coolant system loops, and the steam generator and the reactor vessel are connected to each other by a hot leg pipe and a cold leg pipe. The reactor coolant pump is disposed on the cold leg pipe. Further, two separate emergency core cooling systems (ECCS) each inject cooling water through an injection nozzle disposed on the cold leg pipe. Two separate ECCS injection pipes are connected to each other by a tie line and are configured to be able to inject water into any of the cold leg pipes.

The reason that two reactor coolant system loops are required in terms of safety as described above is as follows.

(1) Responding to One-Pump Trip Transient

In one-pump trip transient, another reactor coolant pump continues to work to ensure a core flow rate required for cooling core fuel, guaranteeing integrity and reusability of the fuel. If the second reactor coolant pump is not provided, the one-pump trip transient can be a serious accident event entirely equivalent to all-pump trip, making it impossible to satisfy safety standards for a transient event.

(2) Responding to One-Pump Seizer Accident

At the time of a pump seizer accident where a rotor of one reactor coolant pump is suddenly locked during operation, the another reactor coolant pump coasts down according to its inertia to ensure the minimum core flow rate required for cooling a reactor core to thereby reduce the failure of the core fuel to the minimum level. Further, overpressure in a reactor pressure boundary is prevented so as to satisfy safety standards at the accident time. If the second reactor coolant pump is not provided, the core flow rate immediately runs short due to the pump seizer accident, resulting in occurrence of a serious failure of the core fuel and overpressure in the reactor pressure boundary.

(3) Responding to Loss-of-Coolant Accident

If one cold leg pipe is ruptured at the time of loss-of-coolant accident (LOCA), one emergency core cooling system for injecting cooling water into the cold leg pipe may be disabled. Another emergency core cooling system is assumed to be disabled according to a single-failure criterion that one emergency core cooling system is disabled. Even in such a case, the intact emergency core cooling system injects cooling water into the intact cold leg pipe through a tie line so as to cool the core fuel. If the second intact cold leg pipe does not exist, both the two separate emergency core cooling systems may be disabled.

(4) Responding to Steam Generator Tube Rupture Accident

Upon occurrence of a steam generator tube rupture accident (SGTR), the intact steam generator is used to perform primary system depressurization to equalize the pressure of a primary system to the pressure of a secondary system, thereby stopping outflow of nuclear reactor coolant from the ruptured steam generator to the secondary system. If the second steam generator is not provided, depressurization can be achieved only by means of a pilot operated relief valve (PORV) or a pressurizer spray, resulting in a prolonged outflow of the primary coolant to the secondary system. The prolonged outflow of the primary coolant leads to a prolonged discharge of the primary coolant from the relief valve of the steam generator to environment.

For the above reasons, the minimum required number of the reactor coolant system loops of the conventional PWR is set to two. The two-loop PWR is the minimum constituent unit in the conventional PWRs and generally generates a power of 300 MWe to 600 MWe. That is, the two-loop PWR is categorized as a small-sized reactor as commercial reactors. Basically, design concepts of more than 50 years ago are used for the two-loop PWR, and many active components including pumps, etc., are used for a safety system such as the ECCS. Therefore, there was a problem that the safety of a nuclear reactor cannot be maintained when a prolonged station blackout (SBO) occurs.

The number of the reactor coolant system loops has been increased to three or four in order to increase the output power of the PWR. A three-loop PWR generally generates a power of 800 MWe to 900 MWe as a middle-sized reactor. A four-loop PWR generally generates a power of 1100 MWe class or more as a large-sized reactor.

In the conventional four-loop PWR, four reactor coolant system loops are disposed around the rector vessel. As in the two-loop PWR, one reactor coolant pump and one steam generator are disposed in each reactor coolant system loop. In recent years, supersized four-loop reactors capable of generating a power of 1600 MWe class or more are built or planned. The steam generator in such a supersized reactor has a height of as high as about 20 m, and the volume of a containment vessel for housing four such steam generators reaches up to as extremely great as about 80,000 m$^3$. In such a way the reactor output power of a large PWR is increased by simply increasing the number of loops, and its deign is based on the same design concepts as those of more than 50 years ago for the two-loop PWR. Thus, a full passive safety system without any motor-driven pumps has not been adopted.

On the contrary, there is an AP1000 as an example of a passive safety PWR that is capable of increasing the reactor output power without increasing the number of the reactor coolant system loops from two and capable of satisfying the safety standards for accidents with only passive safety systems in which any motor-driven pumps are not used (Refer to, e.g., IAEA-TECDOC-1391, "Status of advanced light water reactor designs 2004", IAEA, May 2004, p207-p231, p279-p306, the entire content of which is incorporated herein by reference). A description will be given on the AP1000 below with reference to FIGS. 5 to 9.

FIG. 5 is a plan view illustrating a configuration of the reactor coolant system loop (two-loop structure) in a conventional passive safety PWR (AP1000). FIG. 6 is an elevation view illustrating the steam generator and reactor coolant pump of FIG. 5. FIG. 7 is a side view of the steam generator and reactor coolant pump of FIG. 6, which illustrates the inside of the steam generator in a sectional manner. FIG. 8 is an elevation cross-sectional view of a containment vessel used in the passive safety PWR of FIG. 5 and inside thereof. FIG. 9 is a block system diagram of a reactor pressure boundary and a passive cooling and depressurization system (PCDS) used in the passive safety PWR of FIG. 5.

In FIG. 5, a reactor core 1 is housed in a rector vessel 2. Two reactor coolant system loops 50a and 50b are disposed symmetrically with respect to the rector vessel 2. Steam generators 3a and 3b are disposed in their respective reactor coolant system loops. The steam generators 3a, 3b and rector vessel 2 are connected by hot leg pipes 5a, 5b and cold leg pipes 4a, 4b, 4c, 4d. Two reactor coolant pumps 6a and 6b are directly connected to the lower portion of the steam generator 3a, and two reactor coolant pumps 6c and 6d are directly connected to the lower portion of the steam generator 3b. Two separate emergency core cooling systems (ECCS) inject cooling water into the reactor vessel 2 through direct vessel injection nozzles 58a and 58b. Therefore, even if a loss-of-coolant accident in which a cold leg pipe or the like is ruptured occurs, the ECCS is not disabled.

The AP1000 generates a power of about 1117 MWe and thus belongs to four-loop large-sized PWR class in the conventional classification. Thus, four cold leg pipes and four reactor coolant pumps are provided. However, the volume of each steam generator is increased to reduce the numbers of the steam generators and hot leg pipes to two, respectively, thereby succeeding in reducing the number of loops from four to two. This significantly improves the layout efficiency in the containment vessel, thereby succeeding in reducing the volume of the containment vessel to as small as about 58,000 m$^3$. The above advantages are brought about by the improvement of the configuration of the reactor coolant pump directly connected to the steam generator.

FIGS. 6 and 7 are structural views each illustrating an installation method of the steam generator and reactor coolant pump of the AP1000 as a conventional passive safety reactor. The two steam generators have the same configuration, and thus only the steam generator 3a will be described hereinafter.

The two reactor coolant pumps 6a and 6b are directly connected to a channel head 91 disposed at the lower part of the steam generator 3a.

FIG. 7 illustrates a connecting state between the steam generator 3a and the reactor coolant pump 6a as viewed from the direction perpendicular to the direction of FIG. 6. Since the two reactor coolant pumps are overlapped in this point of view, only the reactor coolant pump 6a is illustrated. Further, the internal structure of the steam generator is also illustrated.

A large number of tubes 92 which are heat exchange pipes having a reverse U-shape are disposed inside a barrel portion 22 of the steam generator 3a. In FIG. 7, only one tube is illustrated. The tube 92 is disposed on a tube sheet 93, and the inside of the steam generator is separated into a primary side 94 and a secondary side 95 by tube sheet 93 and tubes 92.

The inside of the tubes 92 and the space below the tube sheet 93 are referred to as a primary side of the steam generator. The outside of the tubes 92 above the tube sheet 93 is referred to as a secondary side of the steam generator. The primary sides of the steam generators and a system connected to the primary sides of the steam generators are collectively referred to as a primary system. Conversely, the secondary sides of the steam generators and a system (not illustrated) connected to the secondary sides of the steam generators are collectively referred to as a secondary system.

A water plenum 96 which is a primary side component is located below the tube sheet 93. The water plenum 96 is divided into an inlet side and an outlet side by a divider plate 97. An inlet nozzle 98 is located on the inlet side, and the hot leg pipe 5a is connected to the inlet nozzle. The two reactor coolant pumps 6a and 6b are connected to the outlet side of the water plenum. Coolant is sucked by the two reactor coolant pumps and discharged from outlet nozzles 99 of the reactor coolant pumps. The cold leg pipes 4a and 4b are connected to the outlet nozzles 99, respectively. The two reactor coolant pumps are connected to one steam generator, and thus the two cold leg pipes are connected to one steam generator. In FIG. 8, the reactor core 1 is housed inside the reactor vessel 2. The reactor vessel 2 is connected to the two steam generators 3a and 3b by the cold leg pipes 4 (4a, 4b, 4c, 4d) and hot leg pipes 5 (5a, 5b). Further, the reactor coolant pumps 6 (6a, 6b, 6c, 6d) are directly connected to the lower portions of the steam generators 3a and 3b. The components and pipes constituting the reactor pressure boundary are housed inside a containment vessel (CV) 7.

The containment vessel 7 of the AP1000 is the most typical containment vessel, called "large dry CV", for use in PWRs. The containment vessel 7 is made of steel, because it is designed to be cooled with the external air in case of an accident.

Inside the containment vessel 7, an in-containment refueling water storage tank 8 is disposed. The in-containment refueling water storage tank 8 works as a gravity-driven cooling system (GDCS) if a loss-of-coolant accident (LOCA) in which the cold leg pipe 4 or the like is ruptured occurs. This gravity-driven cooling system cooperating with other passive ECCS submerges the lower part of the containment vessel up to a higher level than the cold leg pipe 4.

After that, it is designed so that a recirculation screen (not illustrated) is opened, introducing water always into the reactor vessel 2 to cool the fuel in the reactor core safely. Once the water introduced into the reactor vessel 2 is heated by the decay heat of the fuel in the reactor core, steam is generated and the steam fills the gas phase of the containment vessel 7, resulting in a rise of the temperature and pressure in the containment vessel 7.

A shield building 71 is built outside the containment vessel 7. A cooling water pool 72 of a passive containment cooling system (PCS) is disposed on the top of the shield building 71. The cooling water pool 72 is filled with PCS pool water 73. In case of a loss-of-coolant accident, the PCS pool water 73 drains onto the containment vessel 7. Air flows into the shield building 71 through an external air inlet 74 and then a natural circulation force raises the air through the gap between an air baffle 75 and the wall of the containment vessel 7 until the air is discharged outside through a heated air discharge 76 formed at the top of the shield building 71. The combination of the drainage of the PCS pool water 73 and the natural convection of air cools the containment vessel 7 safely.

The shield building 71 including its side wall and ceiling portions has a structure endurable against a large plane crash.

In this way, AP1000 can cool the reactor core 1 and containment vessel 7 with an extremely high reliability only by the passive safety systems requiring no external AC power source. However, the plant output power of the AP1000 is as large as 1117 MWe, and the decay heat after an accident is significantly high, so that the PCS pool water 73 depletes in about three days after the accident. Thereafter, the PCS pool water 73 needs to be replenished. That is, the cooling cannot be achieved only by external cooling air.

In FIG. 9, the reactor pressure boundary of the AP1000 is constituted by one rector vessel 2, primary sides of the two steam generators 3a and 3b, two hot leg pipes 5a and 5b connecting therein, four cold leg pipes 4a, 4b, 4c, and 4d, and one pressurizer 80. The cold leg pipes 4a, 4b, 4c, and 4d circulate coolant cooled by the steam generators 3a and 3b into the reactor vessel 2 by means of the driving force of the reactor coolant pumps 6a, 6b, 6c, and 6d. In FIG. 9, only the cold leg pipes 4a and 4c of the four cold leg pipes are illustrated, and reactor coolant pumps 6a and 6b of the four reactor coolant pumps are illustrated. The pressurizer 80 is connected to the hot leg pipe 5a by a surge piping 81.

A passive residual heat removal system 60 (passive RHR) of the AP1000 includes a passive RHR heat exchanger 61. The passive RHR heat exchanger 61 is disposed so as to be submerged in refueling water 66 stored in an in-containment refueling water storage tank 8. The in-containment refueling water storage tank 8 is disposed below an operating deck 90. The passive RHR heat exchanger 61 is connected to the hot leg pipe 5a through a coolant supply piping 62. An inlet valve 63 is disposed in the middle of the coolant supply piping 62. The passive RHR heat exchanger 61 is connected to the cold leg pipe 4a around the outlet of the steam generator 3a through a coolant return piping 65. An outlet valve 64 is disposed in the middle of the coolant return piping 65.

At the normal operation time, the inlet valve 63 is always opened, allowing coolant to be always supplied to the passive RHR heat exchanger 61 through the coolant supply piping 62. Further, at the normal operation time, the outlet valve 64 is always closed.

During the normal operation time of the plant, the outlet valve 64 is closed, preventing the coolant in the passive RHR heat exchanger 61 from passing inside the cold leg pipe 4a for circulation into the reactor vessel 2. However, when water feed to the steam generators 3a and 3b is stopped due to occurrence of a transient such as loss of offsite electric power or loss of feedwater, the outlet valve 64 is automatically opened by a low water-level signal of the steam generators 3a and 3b. As a result, the primary coolant in the passive RHR heat exchanger 61 passes through the coolant return piping 65 and the cold leg pipe 4a to be circulated into the reactor vessel 2. The drive source for the above circulation is the natural circulation force of the primary coolant given by the decay heat generated in the reactor core 1, and an active drive sources such as pumps are not required for the natural circulation in this configuration.

In the case where a steam generator tube rupture accident (SGTR) occurs, the primary coolant outflows from a ruptured location, and the outlet valve 64 of the passive RHR is automatically opened by a low water-level signal of the pressurizer 80. As a result, the primary coolant in the passive RHR heat exchanger 61 passes through the coolant return piping 65 and the cold leg pipe 4a to be circulated into the reactor vessel 2. However, the depressurization of the primary system by the passive RHR is slow and, actually, the emergency core cooling system (ECCS) is automatically activated at the same time to inject cooling water into the reactor vessel 2 for rapid depressurization. Because decay heat removal after the depressurization is performed by the passive RHR smoothly, the ECCS is manually stopped by an operator and the accident is terminated.

Actually, when a steam generator tube rupture accident (SGTR) occurs, a normal operating chemical and volume control system functions to make up for reduction of the water level in the pressurizer 80. This adversely causes a delay of generation of the pressurizer low water-level signal, which may result in an increase in the outflow of the primary coolant to the secondary system. Actually, occurrence of a steam generator tube rupture accident is obvious from rise of secondary system pressure and water level in the ruptured steam generator and thus it is expected that manual depressurization of the primary system can be performed by an operator at an early stage.

However, at this stage, the outflow of the primary coolant is so small that the operator cannot inject ECCS water into the reactor vessel 2 to depressurize the primary system. Further, the depressurization of the primary system using the passive RHR is slow because it only removes the decay heat. Therefore, the operator uses the intact steam generator having a higher cooling and depressurization function to perform the primary system depressurization. The steam generator has heat removal capacity as about 50 times as the decay heat, and thus the primary system depressurization by the intact steam generator is achieved at high-speed. As a result, actually, the accident can be terminated at an earlier stage.

As described above, in the conventional AP1000, it has been necessary to provide two steam generators for terminating the steam generator tube rupture accident at an earlier stage.

In the AP1000, an automatic depressurization system (ADS) is provided for the purpose of achieving the primary system depressurization at high speed upon occurrence of a loss-of-coolant accident (LOCA) and a station blackout (SBO). The automatic depressurization system has four stages: first to third stages 51 to 53 and a fourth stage 68. The first to third stages 51 to 53 are disposed on the pressurizer 80. The fourth stage 68 of automatic depressurization system is disposed at the same location as the branch position of the coolant supply piping 62 connected to the hot leg pipe 5a.

Once the automatic depressurization system starts operating, all the stages up to the final fourth stage 68 operate. When the final fourth stage 68 operates, the containment vessel 7 is submerged up to the position of the cold leg pipes 4a and 4b, leading to damage of plant property. As a result the plant cannot be restarted for a long period.

In a steam generator tube rupture accident (SGTR), a damaged location is limited only to the inside of the steam generator although it is an accident. Thus, simply by repairing the tube 92 of the steam generator or replacing it with new one, it is possible to restart the plant in a short period. Therefore, for a steam generator tube rupture accident, it is not allowed to use the automatic pressurization system to depressurize the primary system. It is intended to avoid ADS actuation not only for safety but also property protection both in the primary system depressurization using the intact steam generator by the operator and safety systems of the ECCS and the passive RHR.

Along with global warming and increase in crude oil price, expectations for nuclear power generation plant have increased recently on a global basis. In countries with economic power, construction rush of large nuclear reactors of 1000 MWe class or more is about to start. On the other hand, in developing countries, there is a stronger need for small nuclear reactors of 500 MWe or less in terms of relationship between power demand and the scale of a power network corresponding to the power demand. This trend may increase in the future. However, the small nuclear plants are economically inefficient for their scale disadvantage in terms of unit construction cost. Further, unlike the large nuclear reactors, the small nuclear plants have unique designs so as to make it difficult to prove such unique elemental technologies. Further, siting conditions are often worse than those in the economic powers, so that it is necessary to dispose higher safety than that for the large nuclear plants built in the economic powers. Under the circumstances, demanded is a small PWR capable of increasing economic efficiency by simplification, enhancing safety by a passive safety system, and ensuring reliability by proven elemental technologies common with large nuclear reactors.

The minimum number of loops in the conventional PWR was set to two. However, as the plant output power is increased, the number of loops is increased to three and four, and the structure of the primary system becomes complicated. The AP1000 incorporates simplification by the passive safety system has also a two-loop structure. For further simplification, it is desirable to reduce the number of loops to one. In this case, however, the AP1000 needs to be configured to cope with each of the following events with only one reactor coolant loop: one-reactor coolant pump trip, all-pump trip accident, pump seizer accident, loss-of-coolant accident (LOCA), and steam generator tube rupture accident (SGTR).

Further, in the AP1000, although the containment vessel can passively be cooled by a passive containment cooling system (PCS), it is necessary to replenish cooling water after three days. In the worldwide view, as to the siting conditions of the small nuclear reactors, there exist areas where the small nuclear reactors need to be constructed at sites in the inner portions of a continent and along a river. In the entire operating period, e.g., 60 years, of the plant, shortage of river water can be anticipated to occur. Thus, to cope with such problems with siting conditions, it is necessary to provide a small nuclear reactor provided with a passive containment cooling system capable of ensuring safety of the nuclear reactor without necessity of replenishing cooling water in case of an accident.

Further, more severe natural conditions can be anticipated worldwidely as the siting conditions of the small nuclear reactors. Examples of these include giant cyclones in South-East Asia, the massive earthquake that occurred in Sichuan province of China, and the big Tsunami in the Indian Ocean. Occurrence of a station blackout (SBO) due to a sever natural disaster such as a giant cyclone may prevent a recovery work from being started for a long period of time. The cases of Hurricane Katrina in the United States and the giant cyclone in Myanmar suggest the possibility of such a situation. Similarly, the cases of the massive earthquake in Sichuan province of China and the big Tsunami in the Indian Ocean suggest the possibility of such a situation. Thus, it is necessary to provide a small nuclear reactor capable of performing cooling of the reactor core and containment vessel in a continuous manner even when such a prolonged station blackout occurs. To this end, it is necessary to provide a small nuclear reactor capable of naturally ensuring safety forever without supporting actions such as accident management even if the station blackout continues forever.

In the case of a small nuclear reactor of 500 MWe class or less, thorough simplification needs to be conducted so as to overcome the scale disadvantage. This thorough simplification results in adoption of peculiar and less proven new elemental technologies which is possible only in the individual small nuclear reactor. Most of these new elemental technologies have not been adopted at all and will never be adopted in the future in large nuclear reactors that will surely be constructed. Thus, it is impossible to remove risk of occurrence of defect if a small reactor based on such a new peculiar technology is actually constructed and operated.

An object of the present invention is therefore to use proven elemental technologies and device components of large PWRs or those of large PWRs that will surely be constructed in the future so as to remove the risk associated with new construction and thereby to realize a pressurized water reactor plant which is more reliable, better proved, more simplified, and improved in passive safety.

BRIEF SUMMARY OF THE INVENTION

According to one embodiment, a pressurized water reactor plant is provided. The pressurized water reactor plant includes a single reactor vessel housing a reactor core cooled by a high-pressure primary coolant and a single steam generator for generating steam of a secondary coolant. The steam generator has a plurality of tubes in which the primary coolant heated in the reactor core and discharged outside the reactor vessel is circulated, and one barrel portion housing the plurality of tubes and configured so as to guide the secondary coolant, which is lower in pressure than the primary coolant and higher in pressure than atmospheric pressure around the tubes. The pressurized water reactor further includes a hot leg pipe that guides the primary coolant heated in the reactor core from the reactor vessel to the tubes of the steam generator, at least two mutually parallel cold leg pipes for returning the primary coolant that has been passed through the plurality of tubes of the steam generator to the reactor vessel, at least two reactor coolant pumps that feed the primary coolant in the at least two cold leg pipes to the reactor vessel, a pressurizer provided so as to communicate with a reactor pressure boundary in which the primary coolant flows, having a liquid surface therein, and that pressurizes the reactor pressure boundary, a containment vessel containing the reactor vessel, the steam generator, the hot leg pipe, the at least two cold leg pipes, the reactor coolant pumps, and the pressurizer; and a primary system depressurization device for equalizing a pressure of a primary system where the primary coolant flows to a pressure of a secondary system where the secondary coolant flows when an accident has occurred in which a part of the plurality of tubes in the steam generator is ruptured.

The present invention allows pressurized water reactor plants to benefit from reduced risks by employing elemental technologies and device components from large pressurized water reactor plants, including those yet to be constructed. Thus, pressurized water reactor plants which are more reliable, better-proven and have greater passive safety can be realized. Furthermore, the risks associated with new construction can be mitigated, and greater simplicity can be attained.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Figure 1:
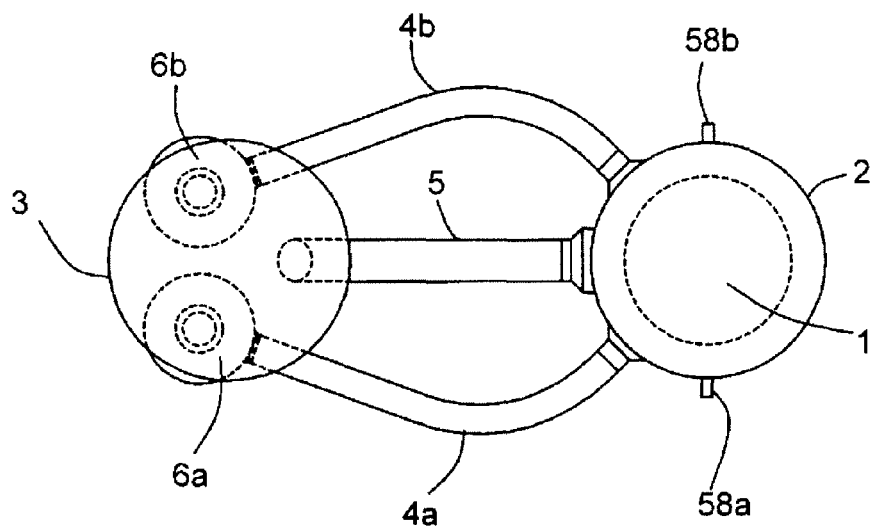
FIG. 1 is a plan view illustrating a configuration of a reactor coolant system loop in a first embodiment of a pressurized water reactor plant according to the present invention.

According to an embodiment, in order to achieve the object, there is provided a pressurized water reactor plant comprising: a single reactor vessel housing a reactor core cooled by high-pressure primary coolant; a single steam generator for generating steam of secondary coolant; the steam generator having: a plurality of tubes in which the primary coolant heated in the reactor core and discharged outside the reactor vessel is circulated, and one barrel portion housing the plurality of tubes and configured so as to guide the secondary coolant lower in pressure than the primary coolant and higher in pressure than atmosphere pressure around the tubes; a hot leg pipe that guides the primary coolant heated in the reactor core from the reactor vessel to the tubes of the steam generator; at least two mutually parallel cold leg pipes for returning the primary coolant that has been passed through the tubes of the steam generator to the reactor vessel; at least two reactor coolant pumps that feeds the primary coolant in the at least two cold leg pipes to the reactor vessel; a pressurizer provided so as to communicate with a reactor pressure boundary in which the primary coolant flows, having a liquid surface therein, and pressurizing the reactor pressure boundary; a containment vessel containing the reactor vessel, the steam generator, the hot leg pipe, the cold leg pipes, the reactor coolant pumps, and the pressurizer; and a primary system depressurization means for equalizing pressure of a primary system where the primary coolant flows to pressure of a secondary system where the secondary coolant flows, when an accident has occurred in which a part of the tubes in the steam generator is ruptured.

EMBODIMENT FOR CARRYING OUT THE INVENTION

First Embodiment

A first embodiment of a pressurized water reactor plant according to the present invention will be described with reference to FIGS. 1 to 3. The same reference numerals are assigned to the same or similar parts as those in the conventional example, and redundant descriptions are omitted. Further, even if only one valve is illustrated as representative of various types of valves in each of the following drawings for simplification, a plurality of valves may be actually arranged in parallel or in series for ensuring of reliability.

FIG. 1 is a plan view illustrating a configuration of a reactor coolant system loop in the first embodiment of the pressurized water reactor plant according to the present invention. FIG. 2 is a block system diagram of a reactor pressure boundary and a passive cooling and depressurization system in the first embodiment of the pressurized water reactor plant according to the present invention. FIG. 3 is an elevation cross-sectional view of a containment vessel and its internal components in the first embodiment of the pressurized water reactor plant according to the present invention.

The pressurized water reactor plant according to the present invention has a reactor core 1 and a reactor vessel 2 housing the reactor core 1. The reactor vessel 2 is connected to one steam generator 3 by two cold leg pipes 4a, 4b and one hot leg pipe 5. The positions of the two cold leg pipes 4a, 4b and connection nozzles of the reactor vessel 2 are not limited to those illustrated in FIG. 1 but may be arbitrarily determined. For example, the two cold leg pipes 4a, 4b and connection nozzles may be arranged so as to face each other at 180 degrees intervals, respectively. Two reactor coolant pumps 6a and 6b for circulating primary coolant in the reactor core 1 and the steam generator 3 are directly connected to the lower portion of the steam generator 3. These primary system components are disposed inside a containment vessel 7 (refer to FIG. 3).

Figure 6:
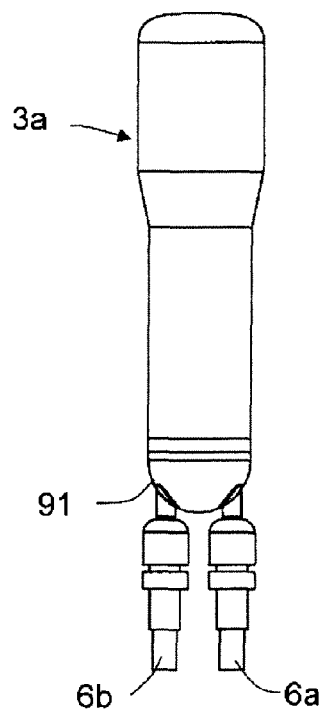
FIG. 6 is an elevation view illustrating the steam generator and reactor coolant pump of FIG. 5.
Figure 7:
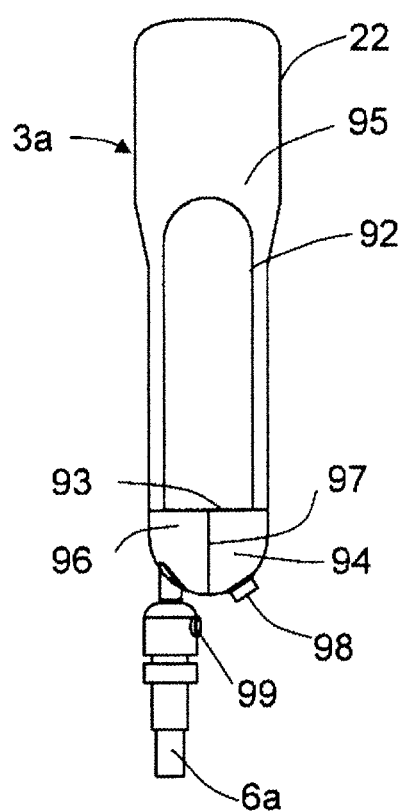
FIG. 7 is a side view of the steam generator and reactor coolant pump of FIG. 6, which illustrates the inside of the steam generator in a sectional manner.
Figure 8:
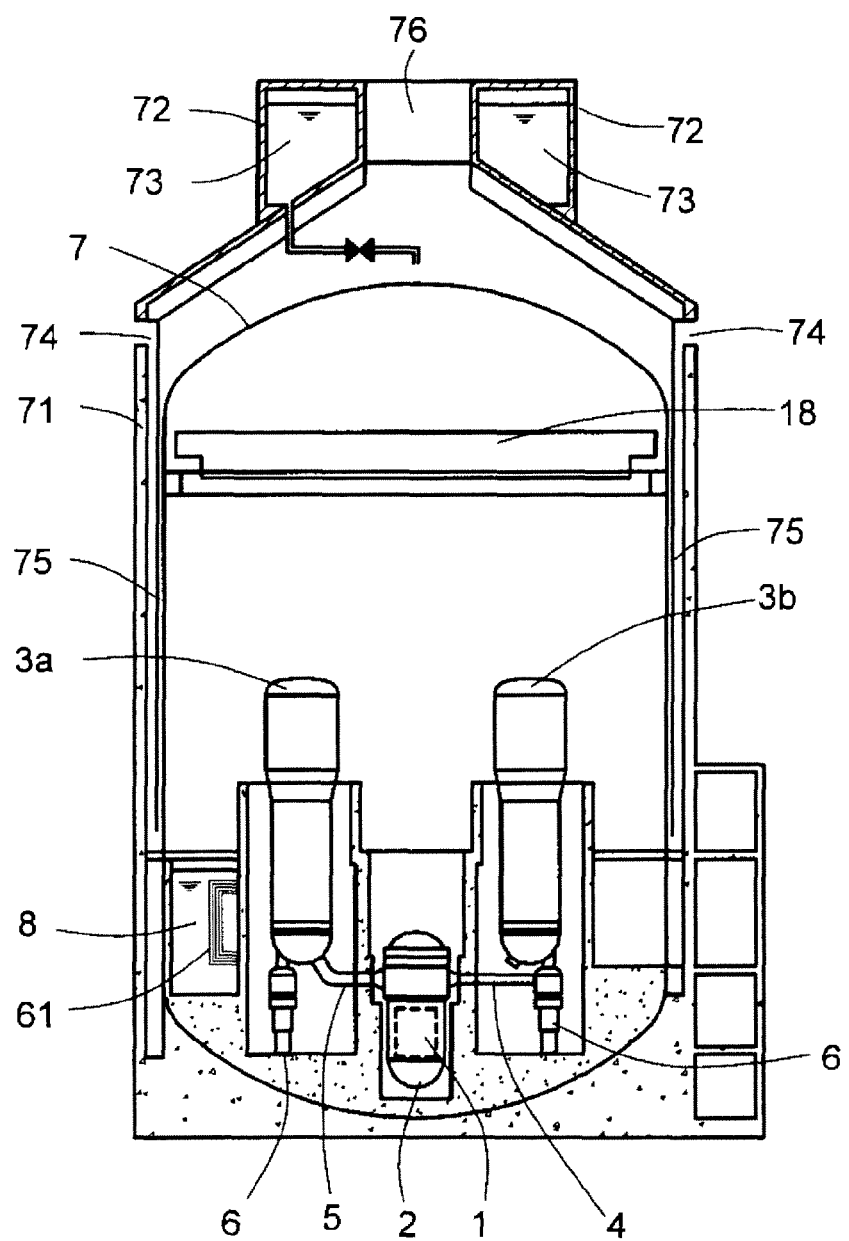
FIG. 8 is an elevation cross-sectional view of a containment vessel used in the passive safety PWR (AP1000) of FIG. 5 and its internal components.
Figure 9:
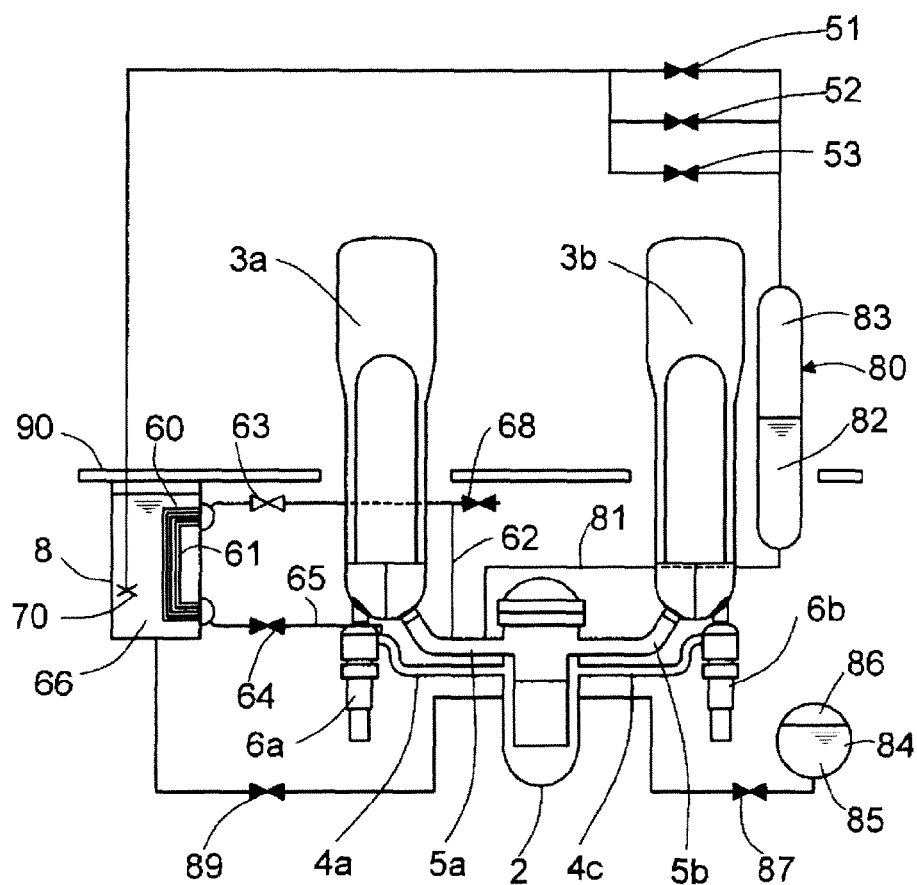
FIG. 9 is a block system diagram of a reactor pressure boundary and a passive cooling and depressurization system used in the passive safety PWR (AP1000) of FIG. 5.

The configuration of the steam generator 3 is the same as that of the conventional steam generator 3a illustrated in FIGS. 6 and 7. The present embodiment employs a configuration in which only one steam generator 3 is disposed in the plant. The plant output power is about 550 MWe, and the pressurized water reactor plant of the present embodiment is of a small type.

At the normal operation time of the pressurized water reactor plant according to the present invention, primary coolant is heated by heat generated in the reactor core 1, and the heated high-temperature primary coolant is supplied from the reactor vessel 2 to tubes 92 of the steam generator 3 through the hot leg pipe 5. Where, the heat of the primary coolant is transmitted to secondary coolant flowing in a secondary side 95 (outside of the tubes 92) of a barrel portion 22 of the steam generator 3, and steam of the secondary coolant is generated. The generated steam of the secondary coolant is fed to a steam turbine (not illustrated) outside the containment vessel 7 and used for power generation. The primary coolant whose heat has been transmitted to the secondary coolant in the tubes 92 is boosted by the reactor coolant pumps 6a and 6b, led through the cold leg pipes 4a and 4b, and returned to the reactor vessel 2. The primary coolant is higher in pressure than the pressure of the secondary coolant, and both the primary coolant and secondary coolant are higher in pressure than atmospheric pressure.

The reactor coolant pumps 6a and 6b are motor-driven pumps, and their electric power sources are connected to different buses (not illustrated). Therefore, in a single bus failure, the two pumps do not lose their electric power simultaneously. The buses are connected to a generator (not illustrated) during the normal operation of the plant. When a generator trip occurs, the buses are supplied from the offsite power, and the pumps continue to operate. Still, it is anticipated that one-pump trip transient in which one reactor coolant pump is stopped occur due to a single bus failure. Even in this case, the remaining one reactor coolant pump continues to operate and provides required coolant flow, thereby ensuring integrity and reusability of the core fuel.

In the case where a whole station bus failure and loss of offsite power occur simultaneously to cause a double pump trip accident in which two reactor coolant pumps lose their electric power simultaneously, the reactor coolant pumps 6a and 6b coast down according to their inertia to allow the coolant flow rate required for cooling of the core fuel at the accident to be maintained for a certain amount of time period.

In the case where the pump seizer accident where the shaft of one reactor coolant pump locks occurs, it is necessary to assume loss of offsite power according to safety criteria. In this case, another reactor coolant pump coasts down according to its inertia to secure cooling of the core fuel and to prevent overpressure of the reactor pressure boundary after the accident.

Two direct vessel injection nozzles (DVI nozzles) 58a and 58b are disposed in the reactor vessel 2. To the direct vessel injection nozzles 58a and 58b, injection pipes of two separate emergency core cooling systems (not illustrated) are connected. Thus, even when the loss-of-coolant accident where, e.g., the cold leg pipe is ruptured, cooling water can directly be injected into the reactor vessel 2 by the two separate emergency core cooling systems.

Figure 2:
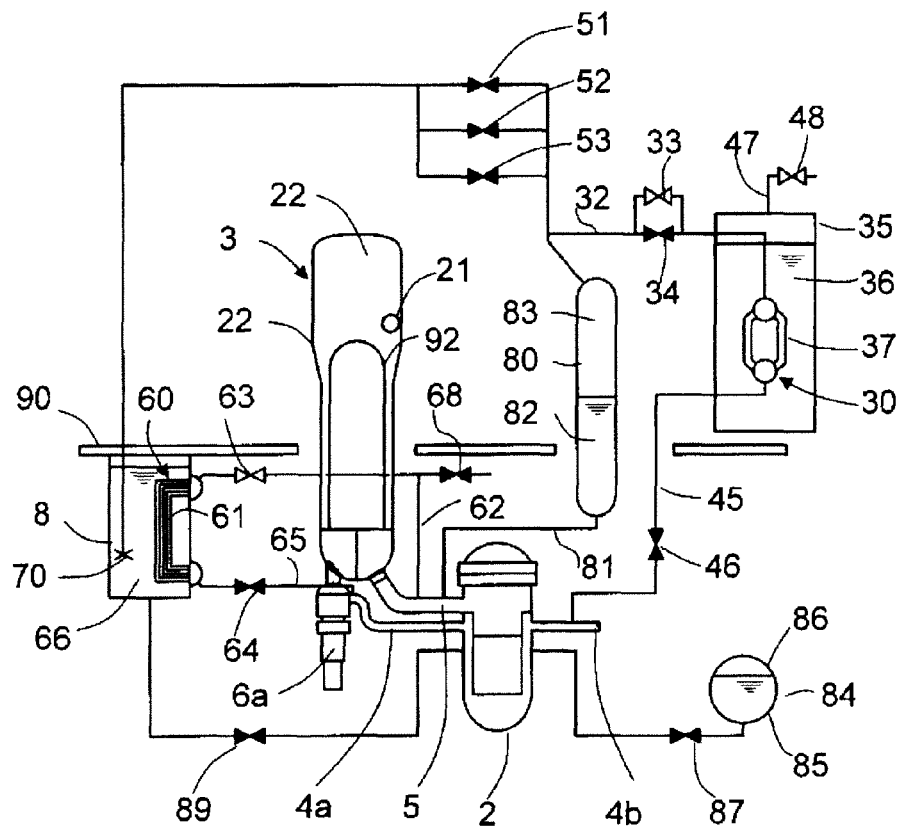
FIG. 2 is a block system diagram of a reactor pressure boundary and a passive cooling and depressurization system in the first embodiment of the pressurized water reactor plant according to the present invention.

As illustrated in FIG. 2, the reactor coolant pumps 6a and 6b are directly connected to the lower portion of the steam generator 3. In FIG. 2, only the reactor coolant pump 6a is illustrated. Although the cold leg pipe 4b is depicted to extend in the opposite direction to the cold leg pipe 4a as an example, the other end of the cold leg pipe 4b is connected to the reactor coolant pump 6b. A pressurizer 80 is connected to the hot leg pipe 5 by a surge piping 81.

A sensor 21 for detecting the steam generator tube rupture accident (SGTR) is attached to the secondary side 95 of the steam generator 3. The sensor 21 is preferably, e.g., a pressure gauge for detecting the pressure of the secondary side of the steam generator 3, a water level gauge for detecting the water level of the secondary side of the steam generator 3, a radioactivity detector for detecting the radioactivity level of the secondary side of the steam generator 3, or combination thereof. In this case, based on one or more of signals indicating the pressure, water level, and radioactivity level of the secondary side 95 of the steam generator 3, leakage of primary coolant to the secondary side 95 due to occurrence of the steam generator tube rupture accident (SGTR) can be detected.

A primary system depressurization device in the present embodiment at the time of occurrence of the steam generator tube rupture accident (SGTR) includes a passive residual heat removal system (passive RHR) 60 and a passive cooling and depressurization system (PCDS) 30.

The passive residual heat removal system (passive RHR) 60 of the present embodiment includes an in-containment refueling water storage tank 8, a passive residual heat removal system heat exchanger (passive RHR heat exchanger) 61, a coolant supply piping 62, an inlet valve 63, a coolant return piping 65, and an outlet valve 64. The passive RHR heat exchanger 61 is disposed inside the in-containment refueling water storage tank 8.

During normal operation of the plant, the inlet valve 63 is always opened, allowing coolant to be always supplied to the passive RHR heat exchanger 61 through the coolant supply piping 62. Further, during normal operation, the outlet valve 64 is always closed.

In the case where the steam generator tube rupture accident (SGTR) occurs, the primary coolant outflows from a ruptured location, and the outlet valve 64 of the passive RHR is automatically opened by a low water-level signal of the pressurizer 80. As a result, the primary coolant in the passive RHR heat exchanger 61 passes through the coolant return piping 65 and cold leg pipe 4a to be circulated into the reactor vessel 2. The low water-level signal of the pressurizer 80 also activates the emergency core cooling system (ECCS) to inject cooling water into the reactor vessel 2 for rapid depressurization. Decay heat removal after the depressurization is smoothly performed by the passive RHR, so that the ECCS is manually stopped by an operator for termination of the accident.

Actually, upon occurrence of the steam generator tube rupture accident (SGTR), a normally operating chemical and volume control system (not illustrated) makes up for reduction in the water level of the pressurizer. This adversely causes a delay of generation of the pressurizer low water-level signal, which may result in an increase in the outflow of the primary coolant to the secondary system and environment. In this case, occurrence of the steam generator tube rupture accident (SGTR) is obvious from rapid rise of secondary system pressure and water level of the rupture-side steam generator 3 and thus it is expected that manual depressurization of the primary system can be performed by an operator at an earlier stage. In this case, although the depressurization of the primary system by the passive RHR 60 is slow, the operator can perform the primary system depressurization by using the passive cooling and depressurization system 30 having a larger capacity for primary system depressurization function.

The passive cooling and depressurization system (PCDS) 30 includes a passive cooling and depressurization system pool (PCDS pool) 35 and a passive cooling and depressurization system heat exchanger (PCDS heat exchanger) 37. PCDS pool water 36 is stored in the PCDS pool 35. The PCDS heat exchanger 37 is disposed inside the PCDS pool 35. That is, the PCDS pool 35 is a cooling water pool capable of storing cooling water used for heat exchange in the PCDS heat exchanger 37.

A steam supply piping 32 extends from the steam phase filled with saturated steam 83 of the pressurizer 80 to the PCDS heat exchanger 37. Parallel branched pipings are formed in the middle of the steam supply piping 32, and a steam supply valve 33 and a depressurization valve 34 are disposed in the middle of each of the parallel branched pipings. A condensate return piping 45 extends from the PCDS heat exchanger 37 to the cold leg pipe 4b constituting the reactor pressure boundary. An injection valve 46 is disposed in the middle of the condensate return piping 45. A steam discharge piping 47 has one end connected to the gas phase of the PCDS pool 35 and the other end opened to the ambient air. A steam discharge isolation valve 48 is disposed in the middle of the steam discharge piping 47.

The present embodiment is so designed as to guide saturated steam 83 in the pressurizer 80 to the PCDS heat exchanger 37, so that the installation position of the PCDS heat exchanger 37 is not restricted by the position of the pressurizer 80. Since steam is a gas, it exhibits a significant higher flow mobility, and the steam easily ascends upward, exceeding the potential energy, by using the differential pressure between the pressurizer 80 and the PCDS heat exchanger 37 as a drive force. Thus, the PCDS pool 35 can be located above an operating deck 90. The vertical interval between the PCDS heat exchanger 37 and the reactor core 1 can be set as large as about 20 m, so that condensate can smoothly be guided to the reactor core 1 by the potential energy.

The steam fed to the PCDS heat exchanger 37 is cooled by the external PCDS pool water 36 to be condensed, so that the inside of the PCDS heat exchanger 37 is always maintained in a depressurized state, that is, maintained in a lower pressure state than the pressure of the pressurizer 80. As a result, the saturated steam 83 in the pressurizer 80 can smoothly be guided to the PCDS heat exchanger 37. This enables higher speed primary system depressurization than the passive RHR 60. At the time of occurrence of the steam generator tube rupture accident (SGTR), the depressurization valve 34 and the injection valve 46 are rapidly opened by the operator's manual operation, thereby achieving the primary system depressurization at high speed. As a result, equalization between the primary system pressure and the secondary system pressure is performed, thereby rapidly stopping outflow of the primary coolant from ruptured steam generator tube.

Only insignificant amount of the primary coolant outflows at the time of occurrence of the steam generator tube rupture accident (SGTR). Thus, the water level of the pressurizer is not lowered, and the ECCS is not activated. As described above, in the present embodiment, if the steam generator tube rupture accident (SGTR) occurs, it is possible to minimize or completely prevent the outflow of the primary coolant to the environment by using the passive cooling and depressurization system 30. Further, it is possible to avoid unnecessary activation of the emergency core cooling system (ECCS).

The occurrence of the steam generator tube rupture accident (SGTR) can be detected not only based on the low water level signal of the pressurizer 80 as described above but also by using, e.g., the sensor 21 attached to the secondary side of the steam generator 3. When the occurrence of the steam generator tube rupture accident (SGTR) is detected in the manner as mentioned above, the passive cooling and depressurization system (PCDS) 30 can be activated automatically or manually by the operator.

When the passive cooling and depressurization system (PCDS) 30 is activated at the time of occurrence of the steam generator tube rupture accident (SGTR), the saturated steam 83 in the pressurizer 80 is guided to the PCDS heat exchanger 37 to heat the PCDS pool water 36, resulting in generation of steam in the PCDS pool 35. The generated steam is passed through the steam discharge piping 47 and then discharged to the ambient air. The PCDS pool water 36 is clean water that does not include radioactivity at all, so that the discharge of the steam generated in the PCDS pool 35 to the ambient air does not adversely affect the environment.

As described above, at the time of occurrence of the steam generator tube rupture accident (SGTR), the passive cooling and depressurization system (PCDS) 30 is activated to perform the primary system high-speed depressurization so as to prevent outflow of the primary coolant including radioactivity from the ruptured steam generator tube to the secondary system and environment and, instead, clean steam generated from clean water in the PCDS pool water 36 that does not include radioactivity at all is discharged to the environment. As a result, it is possible to ensure both safety of the nuclear reactor and public safety.

Although not illustrated, a vent pipe is connected to the header portion of the heat exchanger through a vent valve so as to cope with the case where noncondensable gas such as nitrogen is accumulated inside the PCDS heat exchanger 37. The other end of the vent pipe is guided to, e.g., the inside of the in-containment refueling water storage tank 8.

Further, a steam generator tube rupture accident detector (SGTR detector) that detects one or more of the pressure "high", the water level "high", and the radioactivity level "high" using the sensor 21 (pressure gauge, water level gauge, radioactivity detector, etc.) disposed in the secondary side 95 of the steam generator to generate a steam generator tube rupture accident (SGTR) occurrence signal is provided. Additionally, a passive cooling and depressurization system automatic activation device that automatically activates the passive cooling and depressurization system (PCDS) 30 in response to the steam generator tube rupture accident (SGTR) occurrence signal is also provided. With this configuration, it is possible to terminate the accident with rapidity and high reliability without relying on operator intervention, thereby minimizing adverse environmental impact.

As illustrated in FIG. 2, an accumulator 84 is disposed outside the reactor vessel 2, and cooling water 85 is accumulated therein. High-pressure nitrogen gas is accumulated in the upper portion of the accumulator 84. The lower portion of the accumulator 84 is connected to the reactor vessel 2 by piping having an injection valve 87. Further, the lower portion of the in-containment refueling water storage tank 8 is connected to the reactor vessel 2 by piping having an injection valve 89. This configuration allows injection of the coolant into the reactor vessel 2 in a time of emergency.

Figure 3:
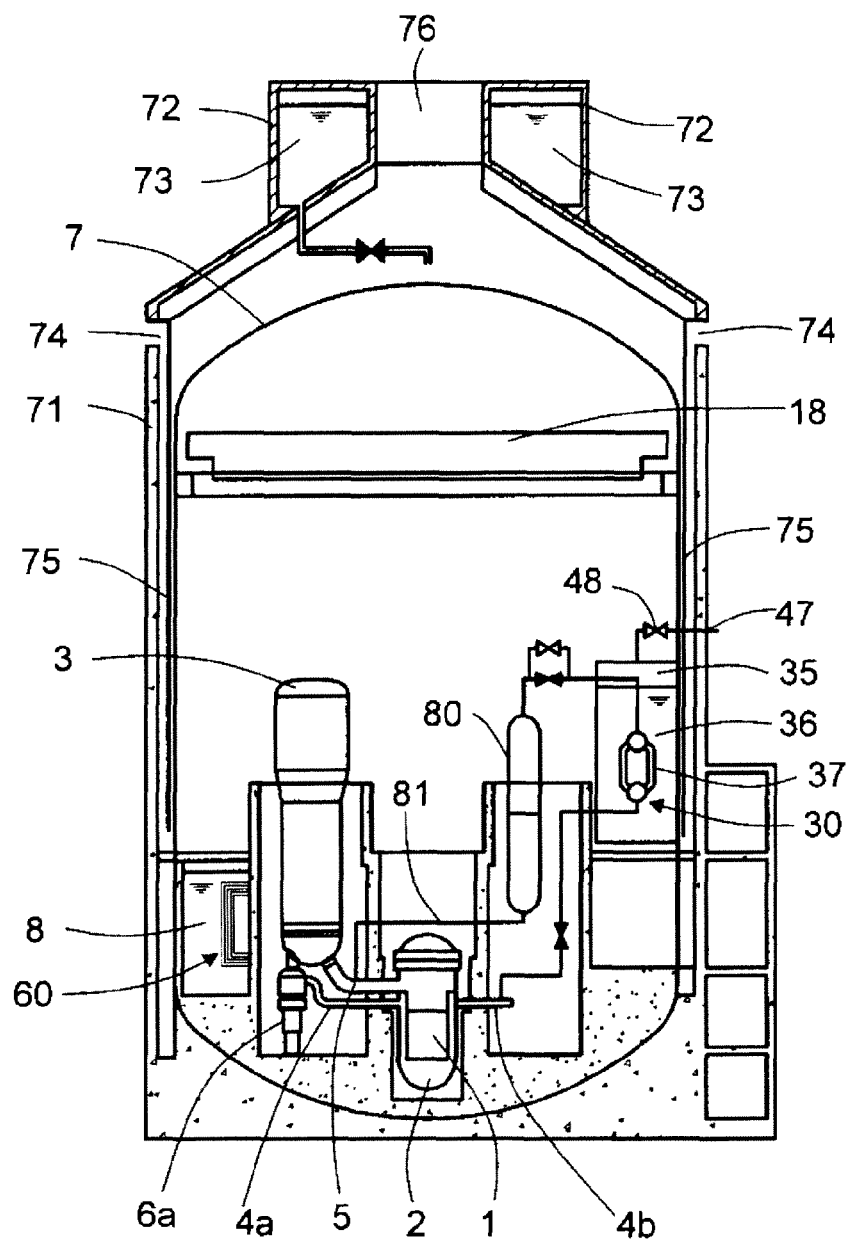
FIG. 3 is an elevation cross-sectional view of a containment vessel and its internal components in the first embodiment of the pressurized water reactor plant according to the present invention.

In FIG. 3, only the reactor coolant pump 6a of the two reactor coolant pumps 6a and 6b is illustrated. Further, for the sake of convenience of illustration, the cold leg pipe 4b in FIG. 3 is illustrated so as to extend in the opposite direction to the cold leg pipe 4a. These components (the reactor vessel 2, the steam generator 3, the pressurizer 80, the reactor coolant pumps 6a and 6b, etc.) and pipes (cold leg pipes 4a and 4b, hot leg pipe 5, etc.) constituting the reactor pressure boundary are all housed inside the containment vessel 7.

The PCDS pool 35 of the passive cooling and depressurization system 30 in the present embodiment is disposed inside the containment vessel 7. The steam discharge piping 47 penetrates the side wall of the containment vessel 7 and opened to the ambient air.

The containment vessel 7 of the present embodiment is the most typical containment vessel, called "large dry CV", for use in PWRs. The containment vessel 7 is made of steel, because it is designed to be cooled with the external air in case of an accident.

The in-containment refueling water storage tank 8 is disposed inside the containment vessel 7. The in-containment refueling water storage tank 8 functions as a gravity-driven cooling system ECCS and, cooperating with other passive ECCS, submerges the lower part of the containment vessel to a level above the cold leg pipes 4a and 4b.

After that, it is designed so that a recirculation screen (not illustrated) is opened, introducing water always into the reactor vessel 2 to cool the fuel in the reactor core safely. If the water introduced into the reactor vessel 2 is heated by the decay heat of the fuel in the reactor core, steam is generated and the steam fills the gas phase of the containment vessel 7, resulting in a rise of the temperature and pressure in the containment vessel 7.

A shield building 71 is built outside the containment vessel 7. A cooling water pool 72 of the passive containment cooling system is disposed on the top of the shield building 71. The cooling water pool 72 is filled with PCS pool water 73. In case of a loss-of-coolant accident, the PCS pool water 73 drains onto the containment vessel 7. Air flows into the shield building 71 through an external air inlet 74 and then a natural circulation force raises the air through the gap between an air baffle 75 and the wall of the containment vessel 7 until the air is discharged outside through a heated air discharge 76 formed at the top of the shield building 71. The drainage of the PCS pool water 73 and the natural convection of air serve to cool the containment vessel 7 in safety. A polar crane 18 is disposed in the upper portion of the containment vessel 7.

In the present embodiment, the plant output power is as small as about 550 MWe, and the decay heat after accident is low, so that the drainage of the PCS pool water 73 is not essential for safety. Nevertheless, in order to maintain the internal pressure of the containment vessel after an accident at a lower level, a configuration allowing drainage of the PCS pool water 73 is adopted.

The shield building 71 including its side wall and ceiling portions has a structure endurable against a large plane crash.

In this way, the pressurized water reactor plant of the present embodiment can cool the reactor core 1 and the containment vessel 7 with an extremely high reliability only by the passive safety systems requiring no external AC power source. Further, the plant output power is as small as about 550 MWe and therefore the decay heat after accident is low. Thus, although the PCS pool water 73 dries up about seven days after the accident, the PCS pool water 73 need not be replenished afterward. That is, the cooling of the reactor core 1 and the containment vessel 7 can be achieved forever only by external cooling air. As a result, it is possible to construct the pressurized water reactor plant of the present embodiment even in an area, such as inner portions of a continent, where cooling water is difficult to be ensured at the accident time.

In the case where a considerably severe natural phenomenon occurs to cause a prolonged station blackout, the reactor core 1 is cooled by the passive cooling and depressurization system 30 in the seven days after the occurrence of the SBO. The generated steam is discharged to the environment from the steam discharge piping 47, so that the containment vessel 7 is not heated. Thus, in this period of time, cooling of the containment vessel 7 is not required. After eight days after the SBO, the reactor core 1 is cooled by the passive RHR 60 only if the PCDS pool water 36 cannot be replenished. The containment vessel 7 heated by the steam generated during operation of the passive RHR 60 is cooled by the passive containment cooling system (PCS).

The cooling of the containment vessel 7 by the passive containment cooling system (PCS) of the present embodiment can be continued forever only by external cooling air even after the PCS pool water 73 depletion. The condensate obtained by condensation of the steam in the containment vessel 7 flows back to the in-containment refueling water storage tank 8 and is used as the cooling water for the passive RHR 60 once again. Therefore, in the pressurized water reactor plant of the present embodiment, it is possible to ensure safety of the reactor core 1 and containment vessel 7 against an indefinite station blackout (SBO).

Second Embodiment

A second embodiment of the pressurized water reactor plant according to the present invention will be described with reference to FIG. 4. The same reference numerals are assigned to the same or similar parts as those in the first embodiment, and redundant descriptions are omitted.

Figure 4:
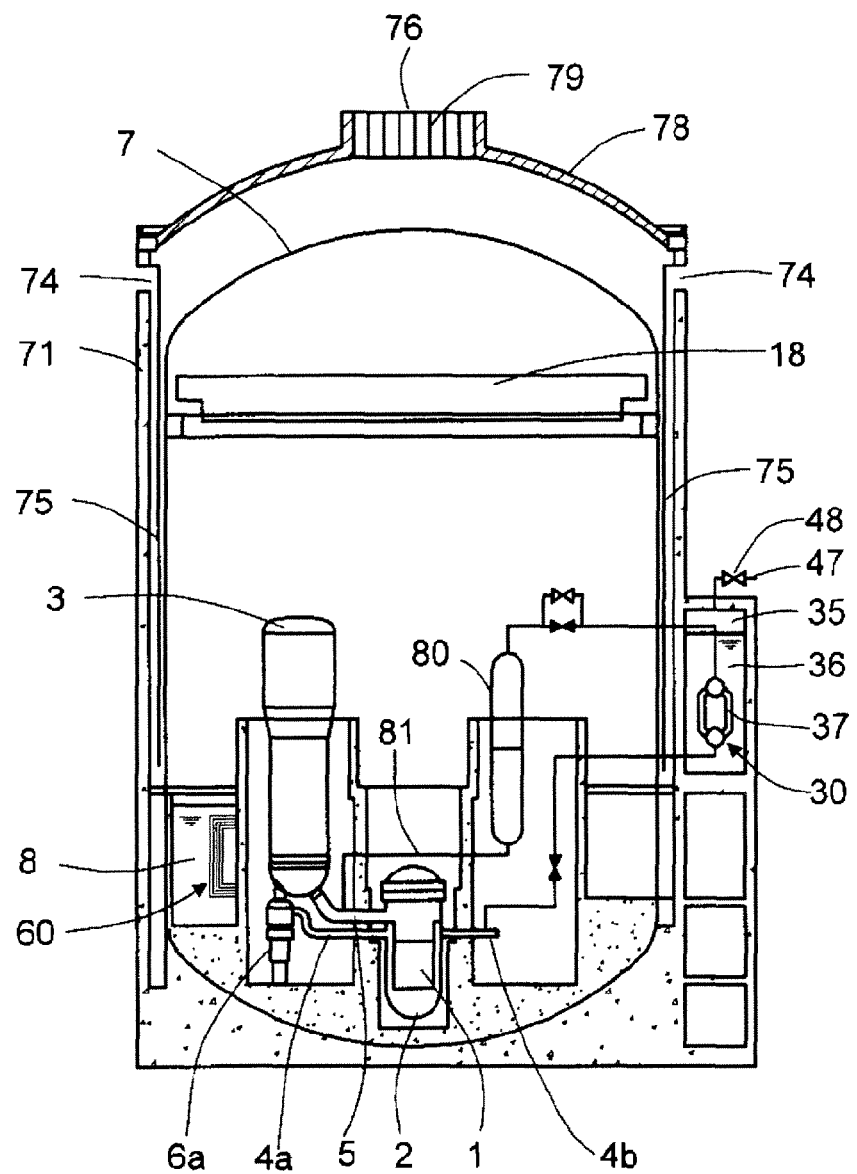
FIG. 4 is an elevation cross-sectional view of a containment vessel and its internal components in a second embodiment of the pressurized water reactor plant according to the present invention.
Figure 5:
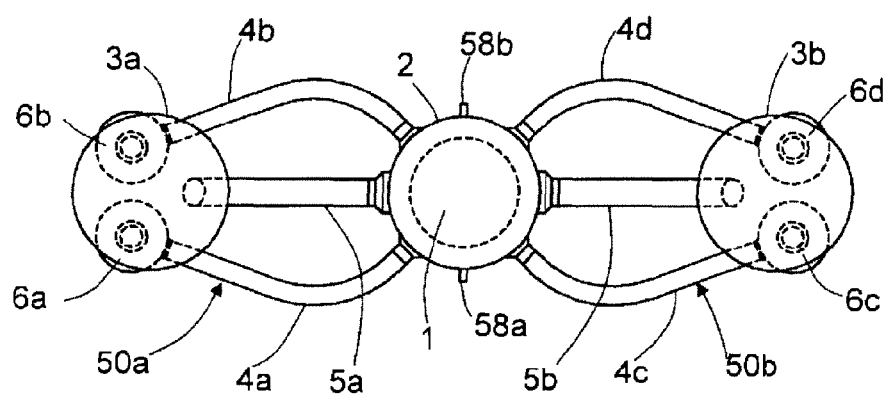
FIG. 5 is a plan view illustrating a configuration of the reactor coolant system loop (two-loop structure) in a conventional passive safety PWR (AP1000)

FIG. 4 is an elevation cross-sectional view of a containment vessel and its internal components in a second embodiment of the pressurized water reactor plant according to the present invention. The configurations illustrated in FIGS. 1 and 2 are the same as those of the second embodiment.

In the present embodiment, the PCDS pool 35 of the passive cooling and depressurization system 30 is disposed outside the containment vessel 7. The PCDS pool water 36 is stored in the PCDS pool 35. The PCDS heat exchanger 37 is submerged in the PCDS pool water 36.

Since the PCDS pool 35 is disposed outside the containment vessel 7, it is possible to eliminate the need for the PCDS pool 35 to have the same degree of pressure resistance and air tightness as the containment vessel 7 and to prevent influence on the layout of components in the containment vessel 7.

The shield building 71 is built outside the containment vessel 7. Air flows into the shield building 71 through an external air inlet 74 and then a natural circulation force raises the air through the gap between an air baffle 75 and the wall of the containment vessel 7 until the air is discharged outside through the heated air discharge 76 formed at the top of the shield building 71. Since the decay heat is low, the natural convection of air serves to cool the containment vessel 7 safely. The shield building 71 including its side wall and ceiling portions has a structure endurable against a large plane crash. A protective grating 79 is disposed inside the heated air discharge 76 to thereby ensure endurance against a large plane crash.

In this way, the pressurized water reactor plant of the present embodiment can cool the reactor core 1 and containment vessel 7 with an extremely high reliability only by the passive safety systems requiring no external AC power source. Further, the plant output power is as small as about 550 MWe and therefore the decay heat after accident is low. Thus, the cooling of the reactor core 1 and containment vessel 7 can be achieved forever only by external cooling air. As a result, it is possible to construct the pressurized water reactor plant of the present embodiment even in an area, such as inner portions of a continent, where cooling water is difficult to be ensured at the accident time.

Further, in the present embodiment, it is not necessary to provide the PCS cooling water pool 72 and PCS pool water 73 of the first embodiment (FIG. 3), which simplifies the structure of a ceiling portion 78 and reduces the weight thereof. Thus, the pressurized water reactor plant of the present embodiment is excellent in earthquake resistance and can be constructed at a site at which a major earthquake is likely to occur.

In a case where a considerably severe natural phenomenon occurs to cause a prolonged station blackout, the reactor core 1 is cooled by the passive cooling and depressurization system 30 in seven days after the SBO. The generated steam is discharged to the environment from the steam discharge piping 47, so that the containment vessel 7 is not heated. Thus, in this period of time, cooling of the containment vessel 7 is not required. After eight days after the accident, the reactor core 1 is cooled by the passive residual heat removal system (passive RHR) 60 only if the PCDS pool water 36 cannot be replenished. The containment vessel 7 heated by the steam generated during operation of the passive RHR 60 is cooled by the passive containment cooling system (PCS) using external cooling air.

The cooling of the containment vessel 7 by the passive containment cooling system (PCS) can be continued forever. The condensate obtained by condensation of the steam in the containment vessel 7 flows back to the in-containment refueling water storage tank 8 and is used as the cooling water for the passive RHR 60 once again. Therefore, in the pressurized water reactor plant of the present embodiment, it is possible to ensure safety of the reactor core 1 and containment vessel 7 against an indefinite station blackout.

Other Embodiment

The configuration of the first embodiment in which the PCDS pool 35 and the like are disposed inside the containment vessel 7 and the configuration of the second embodiment in which not the PCS cooling water pool 72 but the protective grating 79 is disposed in the upper portion of the containment vessel 7 may be combined. Conversely, the configuration of the second embodiment in which the PCDS pool 35 and the like are disposed outside the containment vessel 7 and configuration of the first embodiment in which the PCDS coolant pool 72 is disposed in the upper portion of the containment vessel 7 may be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pressurized water reactor plant comprising:
a single reactor vessel housing a reactor core cooled by a high-pressure primary coolant;
a single steam generator that generates steam of a secondary coolant; the steam generator having:
a plurality of tubes in which the primary coolant heated in the reactor core and discharged outside the reactor vessel is circulated, and
one barrel portion housing the plurality of tubes and configured so as to guide the secondary coolant, which is lower in pressure than the primary coolant and higher in pressure than atmospheric pressure around the plurality of tubes;
a hot leg pipe that guides the primary coolant heated in the reactor core from the reactor vessel to the plurality of tubes of the steam generator;
at least two cold leg pipes configured to return the primary coolant that has been passed through the plurality of tubes of the steam generator to the reactor vessel;
at least two reactor coolant pumps that feed the primary coolant in the at least two cold leg pipes to the reactor vessel;
a pressurizer provided so as to communicate with a reactor pressure boundary in which the primary coolant flows, having a liquid surface therein, and pressurizing the reactor pressure boundary;
a containment vessel containing the reactor vessel, the steam generator, the hot leg pipe, the at least two cold leg pipes, the at least two reactor coolant pumps, and the pressurizer; and
a primary system depressurization device that equalizes a pressure of a primary system where the primary coolant flows to a pressure of a secondary system where the secondary coolant flows, when an accident has occurred in which a part of the plurality of tubes in the steam generator is ruptured.

2. The pressurized water reactor plant according to claim 1, wherein the primary system depressurization device has:
a cooling water pool for storing cooling water;
a heat exchanger submerged in the cooling water pool;
a steam supply piping that connects a gas phase of the pressurizer above a liquid surface of the primary coolant to the heat exchanger and has parallel branching pipings;
a steam supply valve disposed on one of the parallel branching pipings of the steam supply piping;
a depressurization valve disposed on the other one of the parallel branching pipings of the steam supply piping;
a condensate return piping that communicates with the heat exchanger and extends to a liquid phase of the reactor pressure boundary; and
an injection valve disposed on the condensate return piping.

3. The pressurized water reactor plant according to claim 2, further comprising:
a steam generator tube rupture accident detector configured to detect at least one of pressure, water level and radioactivity level of an area of the steam generator where the secondary coolant flows to generate a steam generator tube rupture accident occurrence signal; and
a passive cooling and depressurization system automatic activation device that automatically activates the passive cooling and depressurization system in response to the steam generator tube rupture accident occurrence signal.

4. The pressurized water reactor plant according to claim 2, wherein the cooling water pool is disposed inside the containment vessel.

5. The pressurized water reactor plant according to claim 2, wherein the cooling water pool is disposed outside the containment vessel.

6. The pressurized water reactor plant according to claim 1, wherein the containment vessel is made of steel, and a wall thereof is configured so as to be cooled by natural convection of external air.

7. The pressurized water reactor plant according to claim 1, wherein the containment vessel is made of steel, and the pressurized water reactor plant further comprises:
an upper pool disposed in an upper portion of the containment vessel, the upper pool storing cooling water; and
a water discharge device that makes the cooling water in the upper pool flow down along the wall of the containment vessel by gravity.

\* \* \* \* \*